United States Patent
Sasase et al.

(10) Patent No.: US 11,434,602 B2
(45) Date of Patent: Sep. 6, 2022

(54) SYNTHETIC LEATHER

(71) Applicants: KYOWA LEATHER CLOTH CO., LTD., Hamamatsu (JP); NT&I CO., LTD., Iwaki (JP); SHINSHU UNIVERSITY, Matsumoto (JP)

(72) Inventors: Tadahisa Sasase, Hamamatsu (JP); Yusuke Kato, Hamamatsu (JP); Shohei Hosoo, Iwaki (JP); Yasushi Murakami, Ueda (JP)

(73) Assignees: KYOWA LEATHER CLOTH CO., LTD., Hamamatsu (JP); NT&I CO., LTD., Iwaki (JP); SHINSHU UNIVERSITY, Matsumoto (JP)

( * ) Notice: Subject to any disclaimer, the term of this patent is extended or adjusted under 35 U.S.C. 154(b) by 37 days.

(21) Appl. No.: 16/756,283

(22) PCT Filed: Oct. 26, 2018

(86) PCT No.: PCT/JP2018/039999
§ 371 (c)(1),
(2) Date: Apr. 15, 2020

(87) PCT Pub. No.: WO2019/083046
PCT Pub. Date: May 2, 2019

(65) Prior Publication Data
US 2020/0325625 A1  Oct. 15, 2020

(30) Foreign Application Priority Data
Oct. 27, 2017  (JP) .............................. JP2017-208527

(51) Int. Cl.
*D06N 3/00* (2006.01)
*B82Y 30/00* (2011.01)

(52) U.S. Cl.
CPC ......... *D06N 3/0068* (2013.01); *D06N 3/0059* (2013.01); *D06N 3/0063* (2013.01);
(Continued)

(58) Field of Classification Search
CPC ............. B82Y 30/00; D06N 2205/103; D06N 2209/067; D06N 3/0036; D06N 3/0059;
(Continued)

(56) References Cited

U.S. PATENT DOCUMENTS

| 6,617,008 B1* | 9/2003 | Kono ...................... B32B 27/32 428/195.1 |
| 2011/0117353 A1* | 5/2011 | Henshaw ................ D02G 3/443 428/221 |
| 2017/0183509 A1* | 6/2017 | Grunlan .................... B32B 5/02 |

FOREIGN PATENT DOCUMENTS

| CN | 103696272 A | 4/2014 |
| JP | H02-264081 A | 10/1990 |

(Continued)

OTHER PUBLICATIONS

Jan. 15, 2019 Search Report issued in International Patent Application No. PCT/JP2018/039999.
(Continued)

*Primary Examiner* — Arti Singh-Pandey
(74) *Attorney, Agent, or Firm* — Oliff PLC

(57) ABSTRACT

A synthetic leather includes: a base cloth; on the base cloth, an adhesion layer, a skin layer, and a flame-retardant layer, in this order, in which the flame-retardant layer includes at least one selected from hydrotalcite or a hydrotalcite-like compound, and is a cured product of a composition that includes a binder and particles having an average particle diameter of from 10 nm to 2500 nm, and is a layer having a thickness of from 1 μm to 20 μm.

12 Claims, 1 Drawing Sheet

(52) U.S. Cl.
CPC ........ *B82Y 30/00* (2013.01); *D06N 2205/103* (2013.01); *D06N 2209/067* (2013.01)

(58) Field of Classification Search
CPC .. D06N 3/0063; D06N 3/0068; D06N 3/0095; D06N 3/06; D06N 3/14; D06N 3/183
See application file for complete search history.

(56) References Cited

FOREIGN PATENT DOCUMENTS

| | | |
|---|---|---|
| JP | 2006-77349 A | 3/2006 |
| JP | 2009-209489 A | 9/2009 |
| JP | 2010-77554 A | 4/2010 |
| JP | 2013-189736 A | 9/2013 |
| JP | 2013-209488 A | 10/2013 |
| JP | 5405383 B2 | 2/2014 |
| JP | 2014-80713 A | 5/2014 |
| JP | 2016-79375 A | 5/2016 |
| JP | 6012905 B2 | 10/2016 |
| WO | 2014/208685 A1 | 12/2014 |
| WO | 2015/152279 A1 | 10/2015 |

OTHER PUBLICATIONS

Feb. 25, 2022 Office Action issued in Chinese Application No. 201880066922.9.

\* cited by examiner

SYNTHETIC LEATHER

TECHNICAL FIELD

The present disclosure relates to a synthetic leather.

BACKGROUND ART

In recent years, in place of natural leathers or fiber sheets, synthetic leathers having excellent durability are widely used for automotive interior parts (such as instrument panels, door trims, seats, or ceilings), railroad vehicle interior parts or aircraft interior parts (such as trims, seats, or ceilings), furniture, footwear such as shoes, bags, interior and exterior members for construction, clothing coverings, clothing linings, wall covering materials, and the like. For example, synthetic leathers applied to aircraft interior parts and automobile interior parts need to be lightweight, durable, and have favorable flame retardancy. Furthermore, in such applications, there is a need for synthetic leathers which have a thickness to some degree and moderate elasticity in addition to such basic properties and which have a feel close to that of natural leathers.

From the viewpoint of the dimensional stability and processability, synthetic leathers generally include, on a surface of a fibrous sheet such as a base cloth, a flexible resin layer for adjusting elasticity appropriately and a skin layer having a leather-like appearance and excellent in abrasion resistance.

With regard to the flame retardancy of a synthetic leather applied to interior parts such as automobiles, interior and exterior members for construction, clothing coverings, clothing linings, and wall materials, it is considered to be important that it is hard to burn even if a synthetic leather comes into contact with flames, that, even if a part of a synthetic leather burns, it is hard to spread, that it is hard to generate smoke when a synthetic leather burns, and the like.

In order to improve the flame retardancy, a resin of synthetic leather usually includes a flame retardant. For example, a synthetic leather including a flame-retardant polyurethane resin and a flame-retardant polyurethane resin layer in which a phosphine-based metal salt is mixed in a specific ratio with a polyurethane resin (see Japanese Patent Application Laid-Open (JP-A) No. 2016-79375), and a synthetic leather including, between a substrate and a skin material, a polyurethane adhesion layer including a phosphate ester-based flame retardant plasticizer (see JP-A No. 2013-189736) have been proposed.

A synthetic leather obtained by subjecting a synthetic leather base cloth to a flame-retardant processing with a nitrogen-phosphorus-based flame retardant for the purpose of improving flame retardancy (see JP-A No. 2006-77349), and a flame retardant synthetic leather base cloth knitted using a non-flame retardant polyester fiber and a flame retardant polyester fiber that includes a phosphorus-containing flame retardant (see JP-A No. 2010-77554) have been also proposed.

A synthetic leather using a flame-retardant polyurethane resin obtained by using a phosphorus-containing chain extender as a chain extender and introducing a flame retardant into a polyurethane resin molecule when synthesizing a polyurethane resin has been also proposed (see Japanese Patent Publication (JP-B) No. 5405383).

SUMMARY OF INVENTION

Technical Problem

However, generally used phosphorus compounds as flame retardants described in JP-A No. 2016-79375, JP-A No. 2013-189736, JP-A No. 2006-77349, and JP-A No. 2010-77554 each require complicated procedures for their management and handling. Furthermore, when a flame retardant is added in an amount that gives sufficient flame retardancy to a resin material, there is a problem that the original texture of the resin may be impaired or that the durability of the resin itself may decrease due to an influence of the flame retardant.

In the method described in JP-B No. 5405383, since the chain extender has a flame-retardant partial structure, it is difficult to synthesize a flame-retardant polyurethane, the kind of resulting polyurethane resin is limited, and it is hard to obtain a polyurethane resin for synthetic leather having a desired texture and durability.

An object of one embodiment of the present invention is to provide a synthetic leather which has favorable flame retardancy and in which deterioration in texture and durability due to a flame-retardant treatment is suppressed.

Solution to Problem

Means for solving the above-described problems includes the following embodiments.

<1> A synthetic leather comprising:
a base cloth; and
on the base cloth, an adhesion layer, a skin layer, and a flame-retardant layer, in this order, wherein the flame-retardant layer comprises at least one selected from hydrotalcite or a hydrotalcite-like compound, is a cured product of a composition that comprises a binder and particles having an average particle diameter of from 10 nm to 2500 nm, and is a layer having a thickness of from 1 μm to 20 μm.

<2> The synthetic leather according to <1>, wherein the hydrotalcite-like compound is a compound represented by General Formula (I) below, $$[(A^1)^{2+}{}_{1-x}(A^2)^{3+}{}_x(OH)_2][(B^1)^{n-}{}_{x/n} \cdot mH_2O] \quad \text{General Formula (I)}$$

wherein, in General Formula (I), $(A^1)^{2+}$ represents $Ca^{2+}$, $Mg^{2+}$, $Fe^{2+}$, $Co^{2+}$, $Ni^{2+}$, $Cu^{2+}$, or $Zn^{2+}$, and $(A^2)^{3+}$ represents $Al^{3+}$, $Ti^{from\ 3+\ to\ 4+}$, $Cr^{3+}$, $Fe^{3+}$, $Co^{3+}$, or $(Mo^{from\ 5+\ to\ 6+})$, $(B^1)^{n-}$ represents a sulfate derivative ion, a sulfonic acid derivative ion, or a phosphate derivative ion, and x represents a number of from 0.20 to 0.33, n represents a valence of an anion, and m represents an arbitrary number.

<3> The synthetic leather according to <1> or <2>, wherein at least one of the adhesion layer or the skin layer comprises a flame retardant.

<4> The synthetic leather according to any one of <1> to <3>, further comprising an intermediate layer between the adhesion layer and the skin layer.

<5> The synthetic leather according to <4>, wherein the intermediate layer comprises a flame retardant.

<6> A synthetic leather comprising:
a base cloth; and
on the base cloth, a resin layer and a flame-retardant layer, in this order, wherein the flame-retardant layer comprises at least one selected from hydrotalcite or a hydrotalcite-like compound, is a cured product of a composition that comprises a binder and particles having an average particle diameter of from 10 nm to 2500 nm, and is a layer having a thickness of from 1 μm to 20 μm.

<7> The synthetic leather according to <6>, wherein the resin layer comprises a vinyl chloride resin.

<8> The synthetic leather according to any one of <1> to <7>, wherein the base cloth comprises at least one flame-retardant fiber selected from the group consisting of an aramid fiber, a meta-aramid fiber, a polyphenylene sulfide fiber, an acrylic fiber, a vinyl chloride fiber, a polychlal fiber, a vinylidene chloride fiber, an acrylic-vinyl chloride copolymer fiber, an acrylic-vinylidene chloride copolymer fiber, and a polybenzimidazole fiber.

<9> The synthetic leather according to any one of <1> to <7>, wherein the base cloth is a base cloth in which a non-flame retardant base cloth has been subjected to a flame-retardant treatment.

Advantageous Effects of Invention

According to one embodiment of the present invention, a synthetic leather in which deterioration in texture and durability due to a flame-retardant treatment is suppressed can be provided.

DESCRIPTION OF EMBODIMENTS

Hereinafter, specific embodiments of the synthetic leather of the present disclosure will be described in detail, but the present disclosure is not limited thereto in any way, and can be implemented with appropriate modifications within the scope of the object of the present disclosure.

Herein, numerical ranges indicated using "to" mean a range including the numerical values described before and after "to" as the minimum value and the maximum value, respectively.

Herein, an amount of each component in a composition means, if a plurality of substances corresponding to each component are present in the composition, a total amount of the plurality of substances present in the composition.

Herein, the term "process" includes not only a process independent from other processes but also a process which cannot be clearly distinguished from other processes as long as a desired purpose of the process can be achieved.

With regard to stepwise numerical ranges described herein, the upper limit value or the lower limit value described in one numerical range may be replaced with the upper limit value or the lower limit value of another stepwise numerical range. In the numerical ranges described herein, upper limit values or lower limit values of the numerical value ranges may be replaced with values described in Examples.

Herein, a combination of preferred embodiments is a more preferred embodiment.

In each drawing herein, components denoted by the same symbols mean the same components.

<Synthetic Leather>

Hereinafter, preferred embodiments of the synthetic leather of the present disclosure will be described. The embodiment described below is an example, and the present disclosure is not limited to the following embodiment.

Layer Structure of Synthetic Leather According to First Embodiment

Figure 1:
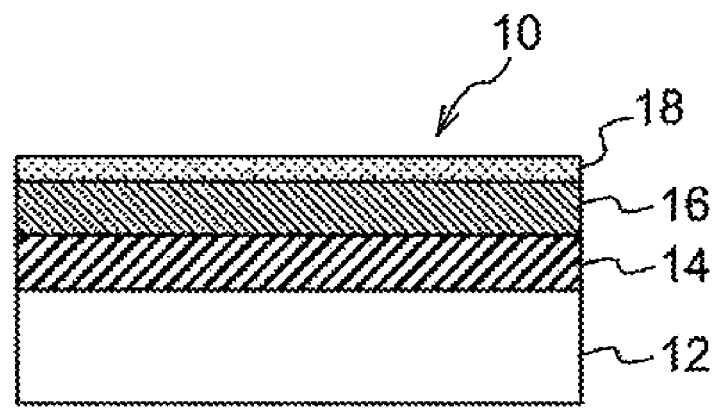
FIG. 1 is a schematic sectional view showing one aspect of a synthetic leather in the present disclosure.

FIG. 1 is a schematic cross-sectional view illustrating one aspect of a synthetic leather 10 of the present disclosure.

The synthetic leather 10 of the embodiment shown in FIG. 1 (sometimes referred to as a first embodiment) includes, on one side of a base cloth 12, an adhesion layer 14, a skin layer 16, and a flame-retardant layer 18, in this order. Herein, "including in this order" means that the adhesion layer 14 and the skin layer 16 are present on the base cloth 12 in this order, and presence of other layers that may be optionally provided is not denied.

As described below, the above-described flame-retardant layer includes at least one selected from hydrotalcite or a hydrotalcite-like compound, is a cured product of a composition that comprises a binder and particles having an average particle diameter of from 10 nm to 2500 nm, and is a layer having a thickness of from 1 μm to 20 μm.

Since the synthetic leather of the present disclosure includes a flame-retardant layer, a high degree of flame retardancy can be imparted to synthetic leathers having various layer structures according to the purposes without impairing their advantages such as texture and durability.

Herein, a base cloth of the synthetic leather refers to a fabric that is a base material for forming each layer in the synthetic leather, and is selected from a knitted body, a woven fabric, a nonwoven fabric, or the like. The base cloth in the present disclosure is preferably a knitted body.

[Base Cloth]

The base cloth used for the synthetic leather of the present disclosure is not particularly limited, and any base cloth used for synthetic leathers can be used without any particular limitation.

Since the synthetic leather of the present disclosure includes a flame-retardant layer described below as the outermost surface layer or a layer adjacent to the outermost surface layer, a base cloth to be used does not need to be particularly subjected to a flame-retardant treatment or a base cloth using a flame-retardant fiber does not need to be used. However, as described below, a flame retardant base cloth may also be used to further increase the flame retardancy of a synthetic leather.

As the base cloth, a known base cloth used for synthetic leathers can be used without limitation.

Examples of the fiber used for a base cloth include a polyurethane fiber, an acrylic fiber, a polyester fiber, a polyamide fiber, a Kevlar fiber which is a high-strength polyamide fiber, a rayon fiber, and a cotton fiber. These are appropriately selected according to the purpose of use of a synthetic leather.

The base cloth may be composed of one kind of fiber, or may be composed of two or more kinds of fibers.

For example, by using a polyester fiber or the like and a polyurethane fiber in combination, the stretchability of a base cloth is improved. By using a polyester fiber or the like and a Kevlar fiber in combination, the mechanical strength of a base cloth is improved.

The base cloth is preferably a knitted body from the viewpoint of flexibility, and examples thereof include a base cloth such as weft knitting, warp knitting, Russell knitting, interlock knitting, or pile knitting that is known knitted body. However, the method of knitting a knitted body to be used as the base cloth is not limited thereto.

In particular, the base cloth preferably has a structure such as warp knitting or interlock knitting. When a knitted body as the base cloth has a warp knit or interlock knit structure, the base cloth has an appropriate elongation, and the texture and elasticity resulting from the base cloth are more favorable.

Note that a flame retardant base cloth may be used from the viewpoint of achieving a higher flame-retardant fiber.

Examples of the flame retardant base cloth include a base cloth composed of a flame-retardant fiber with a limiting oxygen index (LOI value) of 25 or more, and a base cloth obtained by immersing a known base cloth in a flame retardant.

The LOI value indicates an oxygen concentration required for an object to keep burning, and is measured by the method in accordance with JIS K7201 (2006). Usually, since an oxygen concentration in the air is about 21.2%, when the LOI value is 25 or more, it can be said that the flame retardancy is favorable.

(Flame-Retardant Fiber)

Examples of the flame-retardant fiber that can be used for the base cloth include a fiber having an LOI value of 25 or more. A flame-retardant fiber refers, not to an incombustible fiber, but to a fiber in which burning does not spread even when, for example, a fiber or a knitted body of a fiber comes into contact with a flame thereby being charred or a portion at which the flame came into contact being burned, and in which the burning stops promptly when the flame is detached.

As the flame-retardant fiber, a flame retardant synthetic fiber is preferable from the viewpoint of being able to form a flexible base cloth, and specific examples thereof include an aramid fiber including a meta-aramid fiber, a polyphenylene sulfide fiber, a polychlar fiber, a vinylidene chloride fiber, an acrylic-vinyl chloride copolymer fiber, an acrylic-vinylidene chloride copolymer fiber, a polybenzimidazole fiber, a vinylidene chloride fiber, and a vinyl chloride-based fiber. A base cloth including at least one of these is preferred.

Among the flame-retardant fiber used for the base cloth, it is preferable to include one or more selected from the group consisting of an aramid fiber, a meta-aramid fiber, a polyphenylene sulfide fiber, an acrylic fiber, a vinyl chloride fiber, a polychlar fiber, a vinylidene chloride fiber, an acrylic-vinyl chloride copolymer fiber, and an acrylic-vinylidene chloride copolymer fiber, from the viewpoint of excellent flame retardancy and excellent strength and texture when knitted into a base cloth.

The flame-retardant fiber according to the present disclosure preferably has an LOI value of 25 or more. The LOI value of the flame-retardant fiber is more preferably 26 or more, and still more preferably 28 or more.

When using a yarn containing a flame-retardant fiber for knitting a knitted body, a thickness of the yarn containing a flame-retardant fiber is preferably about from 16 to 40 count in a case of being used for a base cloth for a synthetic leather that is used for interior materials for vehicles or the like.

Herein, the term "count" means "cotton count (cotton yarn count)".

The cotton count of one indicates that a yarn having a length of 840 yards (1 yard: 768.096 m) weighs 1 pound (1 lb: 0.45259237 kg). Therefore, a smaller number of the count indicates a thicker fiber.

Instead of the base cloth including a flame-retardant fiber, a base cloth that has been subjected to a flame-retardant treatment of immersing a non-flame retardant base cloth in a flame retardant and drying may be used. Here, as the flame retardant used in a flame-retardant treatment, a known flame retardant other than hydrotalcite-like compounds may be used, and a composition for forming a flame-retardant layer according to the present disclosure described below may be used as the flame retardant.

Known flame retardants other than hydrotalcite-like compounds that can be used for a flame-retardant treatment of the base cloth or the like in the present disclosure will be described below.

The base cloth may be napped at least one side. Napping can be formed by a conventional method. Contacting a napped surface of the base cloth with an adhesion layer or a resin layer described later improves adhesiveness, adhesive strength, and the like between the base cloth and the adhesion layer or the resin layer.

A base cloth used for the synthetic leather may be a single-layer base material having only a base cloth, or may be a base material having a multilayer structure in which a base cloth and a sheet having physical properties according to a desired purpose are layered.

Hereinafter, respective layers of the synthetic leather according to the first embodiment of the present disclosure are described.

[Skin Layer]

The skin layer of the present disclosure can be applied without limitation as long as the layer is a known skin layer used for a synthetic leather.

In particular, the skin layer preferably includes a polyurethane from the viewpoint of excellent scratch resistance and processability.

As described in detail below, the skin layer may be formed by applying a composition for forming a skin layer including a resin, onto a surface of a release agent layer of a temporary support including the release agent layer, and drying.

Examples of polyurethane that can be used for the composition for forming a skin layer include a polycarbonate-based polyurethane, a polyether-based polyurethane, a polyester-based polyurethane, a polycaprolactam-based polyurethane, and a modified product thereof, and when long-term durability is desired, a polycarbonate-based polyurethane, a silicone-modified polycarbonate-based polyurethane, and the like are preferred.

The polyurethane included in the composition for forming a skin layer may be a water-based polyurethane or a solvent-based polyurethane. As the polyurethane included in the composition for forming a skin layer, a solvent-free thermoplastic polyurethane elastomer (TPU) may be used.

The polyurethane used in the composition for forming a skin layer may be used singly, or in combination of two or more kinds thereof. For example, a polycarbonate-based polyurethane, which is a preferable polyurethane, and a polyurethane other than the polycarbonate-based polyurethane may be used in combination.

Examples of the water-based polyurethane include a water-based polyurethane in which, using a polyether-based polyurethane (homopolymer), a polycarbonate-based polyurethane (homopolymer), or a mixture or a copolymer of a polyether-based polyurethane and a polycarbonate-based polyurethane, from 0.01% to 10%, preferably from 0.05% to 5%, and more preferably from 0.1% to 2% of carboxyl groups in terms of mass ratio with respect to the polyurethane base component described above are introduced into a part of a molecular chain of the polyurethane base component. When a carboxyl group is introduced in a range of the mass ratio described above, due to the presence of the carboxyl group, the water-based polyurethane can have sufficient water dispersibility and dry film-forming properties.

Examples of the solvent-based polyurethane include at least one solvent-based polyurethane selected from the group consisting of a polycarbonate-based polyurethane, a polyether-based polyurethane, a polyester-based polyurethane, and a modified product thereof, which is soluble in an organic solvent. The solvent-based polyurethane may be a one-component type or a two-component type.

The skin layer preferably has a crosslinked structure from the viewpoint that the film strength of the skin layer is more favorable.

For example, in an embodiment in which a crosslinked structure is introduced into a water-based polyurethane, by using a polyurethane main component into which a carboxyl group has been introduced, the carboxyl group and the crosslinking agent can be reacted to form a crosslinked structure.

Examples of the crosslinking agent which may be used for the composition for forming a skin layer in order to form a crosslinked structure include a conventionally known crosslinking agent. Examples thereof include an isocyanate crosslinking agent, an epoxy crosslinking agent, an aziridine crosslinking agent, a carbodiimide crosslinking agent, and an oxazoline-based crosslinking agent. In particular, it is preferable to use a carbodiimide crosslinking agent from the viewpoint of suppressing hydrolysis of polyurethane.

Examples of an embodiment in which a crosslinked structure is introduced into a solvent-based polyurethane include an embodiment in which a solvent-based polyurethane is used as a main component and a polydiisocyanate is used in combination as a crosslinking component. By using a polydiisocyanate in combination, a crosslinked structure can be formed by heat curing of polyurethane.

The polyurethane used to form a skin layer is preferably a polyurethane capable of forming a film having a hardness in a range of from 2 MPa to 40 MPa, and more preferably in a range of from 3 MPa to 10 MPa, at 100% modulus as measured in accordance with JIS K6772 (1994).

The preferable hardness of a polyurethane in the skin layer is a hardness after forming a crosslinked structure in the skin layer.

A commercially available product may be used as the polyurethane included in the composition for forming a skin layer. Examples of the commercially available product that may be used for the composition for forming a skin layer include CRISVON (registered trademark) NY-324 (trade name) manufactured by DIC Corporation.

The skin layer may further include other components in addition to the resin, which is a main component such as a polyurethane, and a solvent for dissolving the resin.

Examples of such other component that may be included in the skin layer include the above-described crosslinking agent, a crosslinking promoter, a colorant, a brightening agent (such as a pearlescent agent, or a metallic pigment), a light stabilizer, an ultraviolet absorber, an antioxidant, a feel improver, a film-forming aid, a foaming agent, and known flame retardants other than at least one selected from hydrotalcite or hydrotalcite-like compounds.

Examples of the colorant include colored organic resin particles in which a colorant is included in organic resin fine particles selected from the group consisting of urethane-based resin particles, acrylic resin particles, and silicone-based resin particles. In particular, it is preferable to include polycarbonate-based colored resin particles for the colorant, from the viewpoint of the affinity to the polyurethane-based resin, which serves as a dispersion medium, and uniform dispersibility.

In general, an average particle diameter of the organic resin fine particles is preferably in a range of from 0.01 μm to 1.0 μm, and more preferably in a range of from 0.05 μm to 0.8 μm.

For example, when the skin layer includes a colorant, the designability is improved.

Since the synthetic leather of the present disclosure includes a flame-retardant layer, a skin layer does not necessarily need to include a flame retardant; however, for example, when the skin layer includes a known flame retardant other than hydrotalcite-like compounds, the flame retardancy of the synthetic leather is further improved. Known flame retardants that may be used in the synthetic leather of the present disclosure will be described later.

A thickness of the skin layer is not particularly limited, and may be appropriately selected according to the purposes. In general, from the viewpoint of strength and appearance, the thickness of the skin layer after drying is preferably about from 5 μm to 100 μm, and more preferably about from 10 μm to 50 μm.

[Adhesion Layer]

The synthetic leather of the present disclosure may include an adhesion layer at one surface of the skin layer.

For forming an adhesion layer, for example, a polyurethane adhesive may be used. Examples of the polyurethane adhesive that may be used to form an adhesion layer include an adhesive that includes at least one selected from the group consisting of a polycarbonate-based polyurethane, polyether-based polyurethane, polyester-based polyurethane, and a modified product thereof, and an adhesive that includes a polycarbonate-based polyurethane is preferred from the viewpoint of further improving long-term durability.

The polyurethane included in the adhesive used for forming an adhesion layer may be a water-based polyurethane or a solvent-based polyurethane, as is the case with the polyurethane that is used for the skin layer.

The polyurethane included in the adhesive used for forming an adhesion layer is preferably a polyurethane capable of forming a film having a hardness in a range of from 2 MPa to 20 MPa, and more preferably in a range of from 2 MPa to 8 MPa, at 100% modulus as measured according to JIS K6772 (1994).

From the viewpoint of further improving the flexibility of the synthetic leather to be obtained, the polyurethane used for the adhesion layer is preferably a polyurethane capable of forming a film having a flexibility equivalent to that of the polyurethane used for the skin layer, or a polyurethane capable of forming a more flexible film.

A commercially available product may be used as the polyurethane used for forming an adhesion layer. Examples of the commercially available product which may be used for forming an adhesion layer include CRISVON (registered trademark) TA-205 manufactured by DIC Corporation.

As described below, when forming an adhesion layer at one surface of the skin layer, it is possible to employ a method of forming a skin layer on a temporary support, followed by applying a composition for forming an adhesion layer (for example, a composition including a polyurethane adhesive) onto a surface of the skin layer, and drying by heating to form a layer of the composition for forming an adhesion layer having a desired thickness, thereby obtaining a layered body in which an adhesion layer is formed at one surface of the skin layer.

After that, the above-described base cloth and the obtained layered body are thermocompression-bonded in such a manner that the base cloth and the layer of the composition for forming an adhesion layer of the layered body are in contact with each other, to react and cure an adhesive included in the layer of the composition for forming an adhesion layer, thereby performing formation of an adhesion layer and adhesion between the adhesion layer and the base cloth simultaneously, and then peeling off the temporary support, as a result of which a synthetic leather can be obtained.

A crosslinking agent and a crosslinking promoter may be included in the composition for forming an adhesion layer, for the purpose of improving the curability.

The crosslinking agent and the crosslinking promoter are selected according to the kind of polyurethane that is used in the adhesion layer, respectively. Examples of the crosslinking agent and the crosslinking promoter that may be used for the composition for forming an adhesion layer include the same as those described in the composition for forming a skin layer described above, respectively.

The crosslinking agent may be used in combination with a crosslinking promoter suitable for the crosslinking agent.

A content of the crosslinking agent in the composition for forming an adhesion layer may be appropriately selected in consideration of the strength, flexibility and the like that are required for the adhesion layer.

The adhesive may also contain a flame retardant.

A thickness of the adhesion layer after drying is preferably about from 20 µm to 100 µm, and more preferably in a range of from 30 µm to 80 µm. When the thickness of the adhesion layer is in the above-described ranges, a synthetic leather having sufficient elasticity and strength is formed.

[Intermediate Layer]

Depending on the purposes, such as to further improve the strength of the skin layer or to improve the flexibility and cushioning properties of the synthetic leather, the synthetic leather of the present disclosure may include an intermediate layer between the skin layer and the adhesion layer.

There are no particular restrictions on the configuration of the intermediate layer. From the viewpoint of strength and flexibility, an intermediate layer including a polyurethane is preferred.

The polyurethane used for the intermediate layer may be a water-based polyurethane or a solvent-based polyurethane, as is the case with the polyurethane used for the skin layer.

The polyurethane used for forming the intermediate layer is preferably a polyurethane capable of forming a film having a hardness in a range of from 2 MPa to 20 MPa, and more preferably in a range of from 3 MPa to 10 MPa, at 100% modulus as measured according to JIS K6772 (1994).

For the purpose of improving cushioning properties and the like, the intermediate layer may be a polyurethane intermediate layer containing air bubbles.

The polyurethane that may be used for forming the intermediate layer may be a commercially available product. Examples of the commercially available polyurethane which may be used for forming the intermediate layer include CRISVON (registered trademark) S121 manufactured by DIC Corporation.

A thickness of the intermediate layer may be appropriately adjusted according to the purposes. In general, the thickness of the intermediate layer after drying is preferably from 30 µm to 350 µm, and more preferably from 50 µm to 250 µm.

The intermediate layer may further include a component such as a film-forming aid, a pigment, a flame retardant, a filler, an antiaging agent, an ultraviolet light absorbent, or an aromatic agent.

In particular, the intermediate layer preferably includes a flame retardant. When each of the adhesion layer and the intermediate layer includes a flame retardant, the flame retardancy of the synthetic leather is further improved.

[Flame-Retardant Layer]

The flame-retardant layer in the synthetic leather of the present disclosure includes at least one selected from hydrotalcite or a hydrotalcite-like compound, and is a cured product of a composition that includes a binder and particles having an average particle diameter of from 10 nm to 2,500 nm.

Hereinafter, in the present disclosure, a composition for forming a flame-retardant layer may be referred to as "composition for forming a flame-retardant layer". Further, at least one compound selected from hydrotalcite or a hydrotalcite-like compound may be collectively referred to as "specific inorganic layered compound".

Hydrotalcite included in the flame-retardant layer is an inorganic layered compound, and is known as a naturally occurred clay mineral.

Hydrotalcite has a layered crystal structure, and each layer has a structure in which a part of divalent Mg ions is replaced with trivalent Al ions, while maintaining an electrostatic neutrality as a whole by incorporating anions between layers.

Since hydrotalcite has a multi-layer structure, when it is included in a large amount in the flame-retardant layer, the transparency of the layer may be impaired. For this reason, it is preferable that each layer of hydrotalcite having a multi-layer structure is exfoliated into a scale-like form, and is included in the flame-retardant layer in a micronized state, from the viewpoint of transparency of the formed flame-retardant layer. When hydrotalcite is micronized, it is preferable to perform micronization under coexistence with lactic acid.

A method of micronizing hydrotalcite by containing lactic acid is described in detail in JP-A No. 2013-209488, and the method can be applied to the synthetic leather of the present disclosure.

As is the case with hydrotalcite, a hydrotalcite-like compound in the present disclosure has a layered crystal structure, and each crystal fragment is an inorganic layered compound having a leaf-like or scale-like structure, and therefore, when used for a flame-retardant layer, it is considered that an effect similar to that of hydrotalcite is exhibited.

The hydrotalcite-like compound is preferably a compound represented by General Formula (I) below.

In other words, a hydrotalcite-like compound represented by a compound represented by General Formula (I) below fall within the scope of the specific inorganic layered compound.

$$[(A^1)^{2+}_{1-x}(A^2)^{3+}_x(OH)_2][(B^1)^{n-}_{x/n} \cdot mH_2O] \quad \text{General Formula (I)}$$

In General Formula (I), $(A^1)^{2+}$ represents $Ca^{2+}$, $Mg^{2+}$, $Fe^{2+}$, $Co^{2+}$, $Ni^{2+}$, $Cu^{2+}$, or $Zn^{2+}$, and $(A^2)^{3+}$ represents $Al^{3+}$, $Ti^{from\ 3+\ to\ 4+}$, $Cr^{3+}$, $Fe^{3+}$, $Co^{3+}$, or $(Mo^{from\ 5+\ to\ 6+})$.

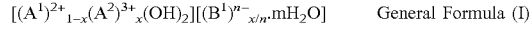

$(B^1)^{n-}$ represents a sulfate derivative ion, a sulfonic acid derivative ion, or a phosphate derivative ion.

x represents a number of from 0.20 to 0.33, n represents a valence of an anion, and m represents an arbitrary number.

n represents a valence of the anion represented by $(B^1)^{n-}$, and is an integer which is not particularly limited and is determined according to the valence.

m represents an arbitrary number that is not particularly limited, and may be a number that is not an integer. Generally, m is more than 0 and about 5 or less.

In General Formula (I), $(A^1)^{2+}$ and $(A^2)^{3+}$ are each independently a host element, and $(B^1)^{n-}_{x/n}$ is an interlayer ion which is a guest ion.

As the interlayer ion, a sulfur compound such as a sulfate derivative ion or a sulfonic acid derivative ion, or a phosphorus compound such as a phosphate derivative ion is employed. One or more selected from these are employed.

Examples of the sulfate derivative ion include a sulfamate ion ($SO_3NH_2^-$), a peroxodisulfate ion ($S_2O_8^{2-}$), a sulfate ion, a persulfate ion, a disulfate ion, a sulfite ion, a disulfite ion, a thiosulfate ion, a dithionite ion, a hydrogen sulfate ion, and a fluorosulfonate ion. Examples of the sulfonic acid derivative ions include an aliphatic sulfonic acid such as trifluoromethanesulfonic acid ion and methylsulfonic acid ion; and an aromatic sulfonic acid ion such as a p-toluenesulfonic acid ion, a p-phenolsulfonic acid ion, a sulfophthalic acid ion, and a polystyrenesulfonic acid ion. In particular, a sulfamic acid ion ($SO_3NH_2^-$), a peroxodisulfate ion ($S_2O_8^{2-}$), and a trifluoromethanesulfonic acid ion ($SO_3CF_3^-$) are preferred.

Examples of the phosphate derivative ion include a phosphate ion, a diphosphate ion, an acidic phosphate ion, a phosphate amide ion, a polyphosphate ion, a phosphite ion, a hypophosphite ion, a superphosphate ion, a triphosphate ion, a phosphonate ion, a phosphinate ion, a peroxomonophosphate ion, a hexafluorophosphate ion, a thiophosphate ion, and a thiophosphate ion.

As the host element, examples of $(A^1)^{2+}$ include $Ca^{2+}$, $Mg^{2+}$, $Fe^{2+}$, $Co^{2+}$, $Ni^{2+}$, $Cu^{2+}$, and $Zn^{2+}$, and examples of $(A^2)^{3+}$ include $Al^{3-}$, $Ti^{from\ 3+\ to\ 4+}$, $Cr^{3+}$, $Fe^{3+}$, $Co^{3+}$, and ($Mo^{from\ 5+\ to\ 6+}$).

In particular, a combination in which $(A^1)^{2+}$ is $Mg^{2+}$ and $(A^2)^{3+}$ is $Al^{3+}$, and a combination in which $(A^1)^{2+}$ is $Zn^{2+}$ and $(A^2)^{3+}$ is $Al^{3+}$ are preferable.

A plurality of hydroxides containing a host element are layered to form a layered structure of a hydrotalcite-like compound, and between the sheets (interlayers), the above-described guest ions and water molecules enter. A thickness between the layers substantially corresponds to a size of guest ions between the layers. Hydrotalcite-like compounds are classified into rhombohedral and hexagonal polytypes depending on how the sheets are stacked. In the rhombohedral type, the number of sheets in a unit cell is three, and in the hexagonal type, the number is two.

The hydrotalcite-like compound is described in detail in JP-B No. 6012905, and the hydrotalcite-like compound described therein can be applied to the present disclosure.

From the viewpoint that the transparency of a flame-retardant layer is more favorable and that the flame-retardant layer is prevented from affecting the appearance of a synthetic leather, it is preferable that a hydrotalcite-like compound such as a compound represented by General Formula (I) is also micronized and contained in the flame-retardant layer as is the case with the hydrotalcite described above. The hydrotalcite-like compound may be micronized by the same method as the above-described method for micronizing hydrotalcite.

The specific inorganic layered compound that is micronized is used as a dispersion composition for forming the flame-retardant layer, and a dispersion composition including a specific inorganic layered compound is used as a composition for forming the flame-retardant layer, whereby a dense and highly transparent flame-retardant layer is formed on a synthetic leather.

In order to form a dense flame-retardant coating, an average particle diameter of the specific inorganic layered compound is preferably about 2,500 nm or less, more preferably 1,000 nm or less, and still more preferably 800 nm or less. On the other hand, the average particle diameter of the specific inorganic layered compound is preferably 10 nm or more, more preferably 50 nm or more, and still more preferably 100 nm or more.

When the average particle diameter of the specific inorganic layered compound is in the above-described range, a flame-retardant layer having a favorable flame retardancy and an excellent transparency can be formed.

Particles of the specific inorganic layered compound may be directly synthesized, or may be micronized after synthesis. In the measurement of the average particle diameter of the particles of the specific inorganic layered compound in the present disclosure, a numerical value obtained by using a dispersion composition including particles of a specific inorganic layered compound as a sample by a dynamic light scattering method using a dynamic light scattering measurement device (manufactured by Malvern Instruments Ltd.) is employed.

A shape of particles of the specific inorganic layered compound is leaf-like or scale-like as described above, and may be an irregular shape instead of a specific regular shape. Therefore, in the measurement of the above-described average particle diameter, the leaf-like or scale-like particles to be measured are represented by an average of the major axis and the minor axis, excluding the thickness.

The specific inorganic layered compound maintains a dense layered structure even after being in contact with a flame and being heated. It is considered that favorable flame retardancy is exhibited since oxygen is blocked by the layered structure remaining after heating. The specific inorganic layered compound mainly composed of an inorganic compound is considered to be a highly safe flame-retardant layer since the compound does not burn itself even when the compound is carbonized and does not generate toxic gas.

A content of the specific inorganic layered compound included in the composition for forming a flame-retardant layer with respect to a total solid content of the composition for forming a flame-retardant layer is preferably in a range of from 20% by mass to 80% by mass, and more preferably in a range of from 35% by mass to 65% by mass.

(Binder)

The flame-retardant layer in the present disclosure is a cured product of a composition including a binder.

When the composition for forming a flame-retardant layer includes a binder, adhesiveness between the flame-retardant layer and an adjacent skin layer or a resin layer described below is improved, the film strength is improved, and the flame retardancy and scratch resistance are further improved.

The binder is not particularly limited, and various organic compounds and inorganic compounds may be used as long as adhesiveness between the flame-retardant layer and an adjacent layer is favorable.

In particular, the binder preferably includes an organic compound from the viewpoints of adhesiveness and stable layer formation. Examples of the organic compound that can be preferably used for the binder include polyvinyl alcohol, polyvinylpyrrolidone, a cellulose derivative, polyacrylamide, polyamine, polyalkylene oxide, polypropylene glycol, a urea resin, a phenol resin, a furan resin, an acrylic acid polymer, a melamine resin, starch, a saccharide, polyethyleneimine, polyamidine, an oxazoline group-containing water-soluble polymer, an acrylic resin, a polyester resin, polyurethane, polyisocyanate, polyvinyl acetate, polyethylene, polypropylene, polyvinyl chloride, an epoxy resin, polycarbonate, an amide resin, an imide resin, a polyphenylene ether, and a silicone.

A thermoplastic elastomer such as an acrylonitrile/butadiene/styrene copolymer (ABS) may be used.

In particular, as a binder in the flame-retardant layer, the same resin as a resin included in an adjacent layer is preferably used. Examples of the same resin as the resin included in an adjacent layer include: a resin having the same main skeleton as that of a resin included in an adjacent layer as a main component; a resin containing the same structural unit as a structural unit contained in a resin that is a main component; and, when a resin as a main component is a modified resin, a resin modified in the same manner as the resin as a main component.

In examples in which the same resin as a resin that is a main component is used, when a flame-retardant layer is formed at one surface of the skin layer including the above-described polyurethane resin, the flame-retardant layer preferably includes a polyurethane resin as a binder, and when a flame-retardant layer is formed at one surface of a resin layer including polyvinyl chloride described below, the flame-retardant layer preferably includes polyvinyl chloride as a binder.

A content of the binder included in the composition for forming a flame-retardant layer, with respect to a total solid content of the composition for forming a flame-retardant layer, is preferably in a range of from 20% by mass to 80% by mass, and more preferably in a range of from 35% by mass to 65% by mass.

(Preparation of Composition for Forming Flame-retardant Layer)

A composition for forming the flame-retardant layer can be prepared by first adding water to a specific inorganic layered compound to make the resultant highly dispersed in such a manner not to precipitate, to obtain a dispersion composition, followed by adding a binder to the obtained dispersion composition. The dispersion composition or the composition for forming a flame-retardant layer may further contain an optional component such as a dispersant.

From the viewpoint of improving the uniform dispersibility of the specific inorganic layered compound in the composition for forming a flame-retardant layer and improving the applicability, a viscosity of the composition for forming a flame-retardant layer (at 25° C.) is preferably in a range of from 100 mPa to 2,000 mPa, and more preferably in a range of from 300 mPa to 600 mPa.

Examples of the method of adjusting the viscosity of the composition for forming a flame-retardant layer include a method of appropriately using a known diluent or thickener.

Examples of the diluent that may be used for adjusting the viscosity include butyl cellosolve, isopropyl alcohol (IPA), and other water-soluble organic solvents.

Examples of the thickener include a water-soluble cellulose, an acrylic resin, polyacrylamide, polyvinylpyrrolidone, a cellulose-based nanofiber, chitin, and a chitosan-based nanofiber.

The viscosity of the composition for forming a flame-retardant layer can be measured using DV-I Prime (manufactured by Brookfield, Inc.).

(Formation of Flame-Retardant Layer)

The flame-retardant layer can be formed by applying the composition for forming a flame-retardant layer onto a skin layer of the synthetic leather and drying.

A thickness of the flame-retardant layer after drying is from 1 μm to 20 μm, and preferably from 2 μm to 10 μm, and more preferably from 2 μm to 5 μm, from the viewpoint of maintaining a flame-retardant effect and feel of the synthetic leather.

When the thickness is in the above-described range, a sufficient flame retardancy can be imparted to the synthetic leather, and an influence of the flame-retardant layer on the appearance, feel, and flexibility of the synthetic leather can be suppressed.

The thickness of the flame-retardant layer in a synthetic leather can be measured by cutting the synthetic leather in a thickness direction and observing the appearing cross section with an electron microscope.

The flame-retardant layer is located at a side that is in contact with flame during a combustion test. When the thickness of the flame-retardant layer is 1 μm or more, occurrence of a crack in the flame-retardant layer due to a combustion gas generated from a skin layer can be suppressed.

The flame-retardant layer, which is a cured product of the composition for forming a flame-retardant layer, is considered to be dehydrated and carbonized when heated, for example, to leave a host compound $[(A^1)^{2+}{}_{1-x}(A^2)^{3+}{}_x O_{(2+x)/2}]$, and a dense layered structure is maintained even after the heating. It is considered that the dehydrated and carbonized layered structure remaining even after heating can block oxygen, and thus can effectively prevent combustion or fire spreading.

Hereinafter, a method of producing the synthetic leather will be described by taking a synthetic leather having a layer structure shown in FIG. 1 as an example.

[Formation of Skin Layer]

The skin layer can be formed by applying a composition for forming the skin layer including a resin, preferably polyurethane, onto a surface of a release agent layer of a temporary support including the release agent layer, for example, with a closed or open coating head, and drying by heating to have a desired thickness.

For the temporary support, a temporary support including a release agent layer on a surface, and including a desired grain pattern (stepped pattern) formed on a surface at a side on which the skin layer is to be formed may be used.

For example, when producing the synthetic leather 10 as shown in FIG. 1 provided with a skin layer having a natural leather-like appearance, a leather-like stepped pattern, a so-called grain pattern may be preformed on a surface of the temporary support at a side on which a release agent layer is to be formed. When forming a grain pattern on a surface of the temporary support, by applying a composition for forming a skin layer onto a surface at a side on which a release agent layer has been formed, a leather-like stepped pattern is transferred to a skin layer 16 that is to be formed.

A method of forming a grain pattern on a skin layer is not limited to the above, and for example, it is also possible to form a grain pattern by conducting embossing when thermocompression of a plurality of layers including a skin layer is carried out.

A polyurethane that can be used for the composition for forming a skin layer is as described above.

An application amount and a film thickness of the skin layer 16 are not particularly limited, and appropriately selected depending on the purposes, and in general, from the viewpoint of strength and appearance, the thickness of the skin layer after drying is preferably about from 5 μm to 100 μm, and more preferably about from 10 μm to 50 μm.

[Formation of Adhesion Layer]

The adhesion layer 14 is provided on a surface of the skin layer 16 that has been formed on the temporary support, accordingly, on a surface at a side opposite to the side of the temporary support.

After forming the skin layer 16 on the temporary support, polyurethane and a composition for forming an adhesion layer are applied onto a surface of the skin layer 16 with a closed or open coating head, and heated and dried to form a layer of the composition for forming an adhesion layer having a desired thickness.

After that, the above-described base cloth 12 and the layered body that includes, on the temporary support, the skin layer 16 and the layer of the composition for forming an adhesion layer are subjected to thermocompression bonding such that the layer of the composition for forming an adhesion layer comes into contact with the base cloth 12, whereby the adhesive included in the layer of the composition for forming an adhesion layer is reacted and cured, to form an adhesion layer 14 and adhere the adhesion layer 14 to the base cloth 12 simultaneously. Thereafter, the temporary support is peeled off, whereby a layered body including, on the base cloth 12, the adhesion layer 14 and the skin layer 16 in this order is obtained.

[Formation of Flame-Retardant Layer]

After that, the composition for forming a flame-retardant layer including a specific inorganic layered compound and a binder is applied onto a surface of the skin layer 16 and dried to form a flame-retardant layer 18.

As described above, by forming the skin layer 16 and the adhesion layer 14 on a temporary support, and bonding and fixing the adhesion layer 14 and the base cloth 12 by curing the adhesion layer 14, and then peeling off the temporary support including a release layer, the synthetic leather 10 having a layered structure as shown in FIG. 1 to which a favorable flame retardancy is imparted without impairing the elasticity, strength, and appearance can be obtained.

The composition for forming a flame-retardant layer may further include a component such as a solvent, a film-forming aid, a pigment, a flame retardant other than specific inorganic layered compounds, a filler, an anti-aging agent, an ultraviolet absorber, or an aromatic.

[Other Layers]

The synthetic leather of the present disclosure may include another layer in addition to the adhesion layer and the skin layer.

For example, an intermediate layer may be provided between the adhesion layer and the skin layer.

By providing an intermediate layer between the adhesion layer and the skin layer, if desired, depending on a usage embodiment of the synthetic leather, the elasticity, flexibility, shape followability, and the like of the synthetic leather become more favorable.

[Formation of Intermediate Layer]

There are no particular restrictions on the structure of an intermediate layer. From the viewpoint of strength and flexibility, an intermediate layer including a polyurethane is preferred.

The intermediate layer can be formed by forming the skin layer 16 on a temporary support as described above, then applying a composition for forming an intermediate layer preferably including polyurethane onto a surface of the skin layer 16 at a side opposite to the temporary support, followed by heating and drying. The application and drying may be repeated twice or more to form an intermediate layer having a desired thickness.

The intermediate layer may be a polyurethane intermediate layer containing air bubbles for the purpose of improving cushioning properties and the like. An example of a method of forming the polyurethane intermediate layer containing air bubbles will be described.

For example, by appropriately using a solvent and a thickener in the composition for forming an intermediate layer including a polyurethane to adjust the viscosity, and mechanically generating foams by stirring, a creamy composition for forming an intermediate layer containing air bubbles can be prepared. By applying the obtained creamy composition for forming an intermediate layer onto the skin layer described above, and drying and curing, a polyurethane intermediate layer containing air bubbles can be formed.

The composition for forming an intermediate layer to be mechanically foamed may contain a foaming agent, a foam stabilizer, a crosslinking agent, a thickener, or the like.

By using a commonly used batch stirrer such as a Hobart mixer or a hopper, the composition for forming an intermediate layer can be mechanically stirred while involving air, by which a mechanically-foamed creamy composition for forming an intermediate layer containing air bubbles can be obtained. In mass production, it is possible to employ a method of producing a composition for forming an intermediate layer containing air bubbles by continuously stirring while feeding a constant amount of air using an oakes mixer, a pin mixer, or the like.

For coating the mechanically-foamed creamy composition for forming an intermediate layer onto the skin layer, a known coating apparatus such as a knife coater, a comma coater, a roll coater, a lip coater may be employed.

It is possible to contain, in a composition for forming an intermediate layer, a chemical foaming agent, such as a thermal expansion microcapsule, 4,4"-oxybis (benzenesulfonyl hydrazide), azodicarbonamide, or sodium hydrogen carbonate, coat the composition onto the above-described skin layer, and then carry out heat-drying to allow the chemical foaming agent to generate air bubbles, by which an intermediate layer containing bubbles can be formed.

A synthetic leather having a layer structure according to another aspect of the present disclosure can be obtained by applying the above-described composition for forming an adhesion layer onto a surface of the formed intermediate layer at a side opposite to the skin layer, to form a layer of the composition for forming an adhesion layer, tightly adhering a base cloth and a surface of the layer of the composition for forming an adhesion layer, curing the adhesion layer, then peeling off the temporary support to form a layered body, followed by forming a flame-retardant layer on a surface thereof.

In a case in which a chemical foaming agent is used, the composition for forming an intermediate layer may contain, in addition to the chemical foaming agent, a foaming agent, a foam stabilizer, a crosslinking agent, a thickener, or the like.

The composition for forming an intermediate layer may further contain a component such as a film-forming aid, a pigment, a flame retardant, a filler, an anti-aging agent, an ultraviolet light absorbent, or an aromatic agent.

(Surface Treatment Layer)

In the synthetic leather of the present disclosure, a surface treatment layer may be further provided on a surface of the flame-retardant layer.

Examples of the surface treatment layer include; a resin layer to give gloss; and a surface treatment layer formed by applying, onto a surface of the flame-retardant layer, a surface treatment agent composition including a water-based emulsion resin or an organic solvent-based surface treatment agent composition.

Any resin may be used for a resin to be used for forming the surface treatment layer. As an example of the resin used for forming a surface treatment layer, a polyurethane, an acryl, an elastomer, or the like is preferable, and a polyurethane is more preferable.

By forming a surface treatment agent layer at a surface of the flame-retardant layer, the appearance is further improved.

The surface treatment layer may contain a crosslinking agent, an organic filler, a lubricant, a flame retardant, or the like. For example, by containing an organic filler, a lubricant, or the like in the surface treatment layer, a smooth feel is imparted to a synthetic leather, and the abrasion resistance of the synthetic leather is further improved.

In the synthetic leather of the present disclosure, since the flame-retardant layer includes a specific inorganic layered compound, even when a surface treatment layer burns, the flame-retardant layer including the specific inorganic layered compound is present between the skin layer and the surface treatment layer, and therefore, the combustion is blocked by the flame-retardant layer and does not reach the skin layer.

Further, in a compound represented by General Formula (I), which is a preferable specific inorganic layered compound, an interlayer ion as a guest ion contains water of crystallization. For this reason, it is considered that heating at the start of a combustion test causes the water of crystallization contained in the compound to be firstly decomposed, and an endothermic reaction to occur in the flame-retardant layer before a carbonized layer is formed. Therefore, even when a surface treatment layer including a flammable resin is present on a surface of the flame-retardant layer, the endothermic reaction of the flame-retardant layer suppresses an increase in the combustion temperature of the surface treatment layer and does not lead to ignition, or the start of combustion. Further, as heating continues, a carbonized layer is formed by a dehydration carbonization action of guest ions, and as a result, in any of the above cases, it is considered that the flame retardancy of the synthetic leather of the present disclosure is not impaired.

Layer Structure of Synthetic Leather According to Second Embodiment

Figure 2:
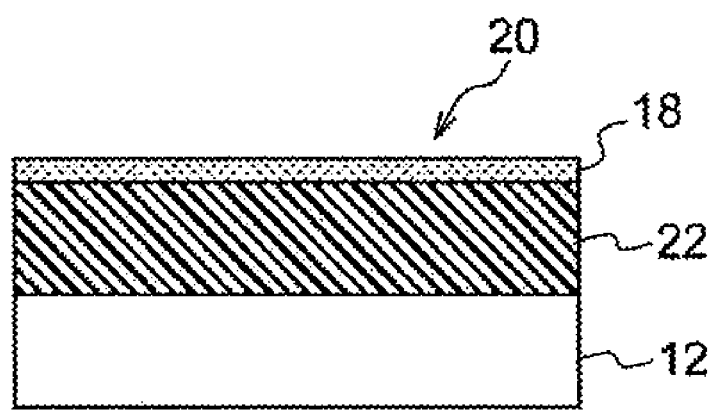
FIG. 2 is a schematic sectional view showing another aspect of a synthetic leather in the present disclosure.

FIG. 2 is a schematic sectional view showing a synthetic leather 20 which is another aspect of the synthetic leather of the present disclosure.

The synthetic leather 20 of the embodiment shown in FIG. 2 (sometimes referred to as a second embodiment) includes: a base cloth 12; and on the base cloth 12, a resin layer 22 and a flame-retardant layer 18 in this order.

The synthetic leather 20 shown in FIG. 2 includes: the resin layer 22 formed by a wet method or a dry method on the base cloth 12; and the flame-retardant layer 18 on a surface of the resin layer 22 at a side opposite to the base cloth 12.

The resin layer 22 is not particularly limited as long as the layer can impart the necessary strength and flexibility to the synthetic leather 20. For forming the resin layer 22, a resin that may be used for forming the skin layer can be used in the same manner.

In particular, from the viewpoint of the flexibility and durability, it is preferable to use a vinyl chloride resin for forming the resin layer 22.

A vinyl chloride resin to be used for the resin layer can be used without any particular limitation as long as the resin is conventionally used for vinyl chloride leathers.

Specific examples of the vinyl chloride resin include: a polyvinyl chloride having an average degree of polymerization of about from 800 to 2,000, and preferably about from 800 to 1,500; a copolymer resin of ethylene, vinyl acetate, methacrylate, or the like, with vinyl chloride that is a main component; and a mixed resin of a vinyl chloride resin with a resin selected from the group consisting of a polyester resin, an epoxy resin, an acrylic resin, a vinyl acetate resin, a urethane resin, an acrylonitrile, styrene-butadiene copolymer resin, a partially saponified vinyl alcohol, and the like.

The resin layer including vinyl chloride may be a foam layer containing bubbles. When the resin layer is a foamed resin layer, the resin layer can be produced by applying a composition that includes a plasticizer, a foaming agent, or the like and a vinyl chloride resin, onto a base cloth by a calendering method or a casting method to form a layer.

Foaming may be performed after a composition for forming a resin layer is applied onto a base cloth, or a foamed resin layer (foamed resin sheet) may be formed followed by adhering the layer to a base cloth.

A vinyl chloride adhesion layer described below may be provided between the vinyl chloride foamed resin layer and the base cloth in order to improve the adhesiveness therebetween.

When the resin layer is formed using a vinyl chloride resin, a thickness of the resin layer is preferably from 20 μm to 500 μm, and more preferably from 100 μm to 300 μm. With a synthetic leather having a thickness in this range, optimum flexibility and voluminous feel are achieved.

[Flame-Retardant Layer]

The configuration and the forming method of the flame-retardant layer in the synthetic leather according to the second embodiment including a resin layer on a base cloth are each the same as those of the flame-retardant layer in the synthetic leather according to the first embodiment described above, and also preferred embodiments thereof are each the same.

Also in the synthetic leather of the second embodiment, since the flame-retardant layer is provided at a surface of the resin layer having excellent flexibility, the synthetic leather has favorable flame-retardancy without impairing the original appearance, feel, and flexibility of the synthetic leather.

(Flame Retardant)

The synthetic leather of the present disclosure has favorable flame retardancy by including a flame-retardant layer.

However, when it is desired to impart a higher degree of flame retardancy to a synthetic leather, each layer described above may include a flame retardant other than the specific inorganic layered compound.

For example, the skin layer, the adhesion layer, and the optional intermediate layer of the synthetic leather according to the first embodiment may each include a flame retardant.

The resin layer of the synthetic leather according to the second embodiment may include a flame retardant.

When each layer includes a flame retardant, the synthetic leather has further improved flame retardancy, and is preferably used for interior materials for aircraft, vehicles, or the like which require a high degree of flame retardancy or the like.

In particular, when a flame retardant is further included in a layer other than the flame-retardant layer, it is preferable that the adhesion layer or the intermediate layer includes a flame retardant from the viewpoint of achieving both maintenance of the appearance and an effect of improving the flame retardancy.

The flame retardant other than the specific inorganic layered compound that may be used for each layer is not particularly limited, and a known flame retardant can be appropriately used. Examples of the flame retardant other than the specific inorganic layered compounds include a metal hydroxide, a phosphorus-based flame retardant, and a nitrogen-phosphorus-based flame retardant.

The flame retardant is also available as a commercial product, for example, PEKOFLAM (registered trademark) STC powder manufactured by Archroma Japan K. K.

Usually, a content of the flame retardant is preferably in a range of from 5 parts by mass to 40 parts by mass with respect to 100 parts by mass of the resin serving as a main component of each layer. However, since the synthetic leather of the present disclosure includes a flame-retardant layer, even when a flame retardant is used, the content thereof may be made lower than usual. In the case of including a flame retardant in the skin layer, the adhesion layer, the intermediate layer, or the resin layer in the synthetic leather of the present disclosure, even when the content thereof is in a range of from 1 part by mass to 20 parts by mass with respect to 100 parts by mass of the resin serving as a main component of each layer, an effective flame retardancy improving effect can be obtained.

A thickness of the synthetic leather can be appropriately selected according to the purpose.

Generally, in the synthetic leather according to the first embodiment, the thickness can be set to from 0.3 mm to 1.0 mm. However, the thickness of the synthetic leather is not limited to the above.

In the synthetic leather according to the second embodiment, the thickness can be set to from 0.8 mm to 1.5 mm. However, the thickness of the synthetic leather is not limited to the above.

The synthetic leather of the present disclosure has favorable flame retardancy without impairing the durability, flexibility, appearance, and the like of the synthetic leather, regardless of the layer structure of the synthetic leather. Therefore, the leather can be suitably used in various fields such as automotive interior materials, railcar interior parts, aircraft interior parts, furniture, footwear such as shoes, bags, interior/exterior members for construction, clothing coverings, and clothing linings. Furthermore, the synthetic leather of the present disclosure also exhibits an effect of, in the case of covering a surface of a member having a complex three-dimensional shape such as a seat or a chair, achieving similar feel and appearance as in the case of using a natural leather.

EXAMPLES

Hereinafter, the synthetic leather of the present disclosure will be more specifically described with reference to Examples. However, the present disclosure is not limited to the following Examples, and various modifications can be made within the scope of the gist thereof.

Example 1

A silicone-modified polycarbonate-based polyurethane having a 100% modulus of 60 kg/cm$^2$ (manufactured by DIC Corporation: Crisbon (registered trademark) NY-324) as a resin for forming a skin layer was coated onto a release paper with grain using a knife coater in such a manner to have a dry thickness of 30 μm, and dried with hot air at 100° C. for 2 minutes to form a silicone-modified polyurethane skin layer on the release paper.

Next, onto the surface of the obtained skin layer, a urethane-based two-component adhesive composed of a polycarbonate-based polyurethane having a 100% modulus of 20 kg/cm$^2$ (manufactured by DIC Corporation: Crisbon (registered trademark) TA-205) was coated with a knife coater in such a manner to have a dry thickness of 30 μm, and dried with hot air at 100° C. for 2 minutes to form a polyurethane adhesion layer, and a non-flame retardant polyester tricot as a base cloth was stacked thereto, whereby a layered body including, on the release paper, the skin layer, the adhesion layer, and the base cloth was obtained.

The release paper of the obtained layered body was peeled off, and a composition A for forming a flame-retardant layer having the following formulation was applied onto the exposed surface of the skin layer at 30 g/m$^2$ using a reverse coater, and dried in a heating furnace at 120° C. for 2 minutes to form a flame-retardant layer. The thickness of the formed flame-retardant layer was 5 μm. A synthetic leather of Example 1 including, on the base cloth, the adhesion layer, the skin layer, and the flame-retardant layer in this order was thus produced.

(Preparation of Composition A for Forming Flame-Retardant Layer)

As a specific inorganic layered compound, HYDROTALCITE (trade name: DHT-6, manufactured by Kyowa Chemical Industry Co., Ltd., average particle diameter: about 1 μm) as a commercially available carbonated LDH (Layered Double Hydroxide) represented by General Formula; $Mg_3Al(OH)_8(CO_3^{2-})_{0.5} \cdot 2H_2O$ was fired at 700° C. for 2 hours to obtain a fired product of the specific inorganic layered compound.

In a mixture of 25.1 parts by mass of ammonium sulfamate ($NH_4SO_3NH_2$) and 1,500 parts by mass of decarbonated ion-exchanged water, 34.4 parts by mass of the obtained fired product of the specific inorganic layered compound was charged and stirred at 60° C. for 2 hours to produce a specific inorganic layered compound including a sulfur compound as a guest compound.

A precipitate of the specific inorganic layered compound including a sulfur compound generated in the solution was washed with water after centrifugation.

Water was added to the obtained precipitate of the specific inorganic layered compound to make it highly dispersed in such a manner not to precipitate, thereby obtaining a dispersion composition (1) including the specific inorganic layered compound including a sulfur compound.

The average particle diameter of the specific inorganic layered compound including a sulfur compound included in the dispersion composition (1) was measured by a dynamic light scattering measurement apparatus (manufactured by Malvern Instruments Ltd.), and found to be 210 nm.

Further, 39 parts by mass of AQ NYLON A-90 (manufactured by Toray Industries, Inc.), 10 parts by mass of DENACOL EX-521 (manufactured by Nagase ChemteX Corporation), and 1 part by mass of an amine compound: 1,4-diazabicyclo[2,2,2]octane (DABCO) were added as binders to 50 parts by mass of the obtained dispersion composition (1), and the resultant was stirred and dispersed under a condition that the specific inorganic layered compound was not precipitated, and the viscosity was adjusted to be in the range of a viscosity suitable for gravure printing from 500 mPa to 2,000 mPa to obtain a composition A for forming a flame-retardant layer.

For adjusting the viscosity, a diluent such as butyl cellosolve or isopropyl alcohol (IPA), or a thickener such as a water-soluble cellulose or an acrylic resin was used.

Example 2

A polycarbonate-based polyurethane having a 100% modulus of 35 kg/cm$^2$ (manufactured by DIC Corporation: Crisbon MP-120) (dimethylformamide solution having solid content of 12%) was applied onto a polyester tricot which was a non-flame retardant base cloth in an amount to give a mass of 1000 g/m², coagulated in water, desolvated, dehydrated, and dried under hot air at 120° C. to obtain a base material on which a wet microporous layer composed of a microporous structure with excellent surface smoothness was formed.

A synthetic leather of Example 2 including, on a base cloth having a wet microporous layer, an adhesion layer, a skin layer, and a flame-retardant layer in this order was obtained in the same manner as in Example 1, except that the base material including a wet microporous layer obtained above was used in place of the non-flame retardant polyester tricot base cloth used in Example 1. The adhesion layer in the layered body of the skin layer and the adhesion layer was stacked to the surface of the microporous layer of the base material. The thickness of the formed flame-retardant layer was 5 μm as in Example 1.

Example 3

After forming the flame-retardant layer (thickness: 5 μm) in Example 1, 15 g/m² of a paint in which a urethane resin (manufactured by Dainichiseika Color & Chemicals Mfg. Co., Ltd., trade name: LEATHEROID (registered trademark) LU-4164) and a primer (trade name: LEATHEROID (registered trademark) LU-4003) were mixed at a mass ratio of 8:2 was applied as a gloss control agent onto the surface of the flame-retardant layer using a gravure roll, and dried in a heating furnace at 120° C. for 2 minutes to form a surface treatment layer. The synthetic leather of Example 3 including, on the base cloth, the adhesion layer, the skin layer, the flame-retardant layer, and the surface treatment layer in this order was thus obtained.

Example 4

(Preparation of Composition for Forming Resin Layer)
20 parts by mass of straight PVC (polyvinyl chloride, manufactured by Kaneka Corporation) having a degree of polymerization of 1,300, and 80 parts by mass of straight PVC having a degree of polymerization of 1,050 (polyvinyl chloride, manufactured by Kaneka Corporation) were mixed to prepare a mixture.

The following reagent was added to 100 parts by mass of the PVC mixture obtained above.

Reagent: Prepared by mixing a) 90 parts by mass of a plasticizer of DINP (manufactured by J-PLUS Co., Ltd.), b) 5.0 parts by mass of butyl stearate (manufactured by Kawaken Fine Chemical Co., Ltd.) as a lubricant, 2.0 parts by mass of a zinc type stabilizer, and 20 parts by mass of calcium carbonate as a filler.

The resulting reagent and the PVC mixture were mixed and plasticized with a supermixer for from 5 to 10 minutes.

Thereafter, the obtained mixture was kneaded for from 5 to 10 minutes with a mixing roll to obtain a composition for forming a resin layer, which was sent to a calendar roll.

(Formation of Synthetic Leather)
Using a calendar roll, the composition for forming a resin layer was rolled into a sheet having a thickness of 0.3 mm. When the thickness of a sheet-like composition layer for forming a resin layer obtained by rolling was consistent, a backing base cloth was laminated while the sheet-like composition layer for forming a resin layer was soft, and a layered body including a resin layer on the base cloth was obtained. As the base cloth, a polyester tricot which was a non-flame retardant base cloth similar to that used in Example 1 was used.

Thereafter, the composition A for forming a flame-retardant layer was applied onto the surface of the resin layer at 30 g/m² using a reverse coater, and dried in a heating furnace at 120° C. for 2 minutes to obtain a synthetic leather (PVC leather) of Example 4 including a resin layer and a flame-retardant layer on the base cloth. The thickness of the formed flame-retardant layer was 5 μm.

Comparative Example 1

A silicone-modified polycarbonate-based polyurethane having a 100% modulus of 60 kg/cm² (manufactured by DIC Corporation: Crisbon NY-324) was coated onto a release paper with grain using a knife coater in such an amount to have a dry thickness of 30 and dried with hot air at 100° C. for 2 minutes to form a silicone-modified polyurethane skin layer.

Next, 30 g/m² of the composition A for forming a flame-retardant layer was applied onto the skin layer with a reverse coater, and dried in a heating furnace at 120° C. for 2 minutes to form a flame-retardant layer on the surface of the skin layer.

Next, onto the surface of the flame-retardant layer, a urethane-based two-component adhesive composed of a polycarbonate-based polyurethane having a 100% modulus of 20 kg/cm² (manufactured by DIC Corporation: Chrisbon TA-205) was coated with a knife coater in such a manner to have a dry thickness of 30 and dried with hot air at 100° C. for 2 minutes to form a polyurethane adhesion layer, and a non-flame retardant polyester tricot as a base cloth was stacked thereto, whereby a synthetic leather of Comparative Example 1 including, on the base cloth, the adhesion layer, the flame-retardant layer, and the skin layer in this order was obtained.

Comparative Example 2

A polyester tricot which is a non-flame retardant base cloth used in Example 1 was immersed in a bath that was filled with the composition A for forming a flame-retardant layer, squeezed with a mangle, and subjected to a flame-retardant processing of crosslinking and drying at 140° C. for 2 minutes, to obtain a flame retardant base cloth.

A synthetic leather of Comparative Example 2 having a layer structure in which an adhesion layer and a skin layer were provided in this order on the base cloth subjected to flame-retardant processing was obtained in the same manner as in Example 1, except that the above-described flame-retardant-processed base cloth was used as the base cloth, and no flame-retardant layer was formed.

Comparative Example 3

50 g/m² of the composition A for forming a flame-retardant layer was applied, with a gravure coater, onto a surface of the base cloth of the synthetic leather produced in Example 1 at a side opposite to the side in contact with the adhesion layer, and dried in a heating furnace at 120° C. for 2 minutes to obtain a base cloth provided with a flame-retardant layer on the back surface. A synthetic leather of Comparative Example 3 having a layer structure in which an adhesion layer and a skin layer were provided in this order on a base cloth provided with a flame-retardant layer on the back surface was obtained in the same manner as in Example 1, except that the above-described base cloth of which back surface is subjected to flame-retardant processing was used, and no flame-retardant layer was formed.

Comparative Example 4

A synthetic leather of Comparative Example 4 having a layer structure in which an adhesion layer including a flame retardant and a skin layer were provided in this order on a base cloth was obtained in the same manner as in Example 1, except that 30 parts by mass of a phosphate ester-based flame retardant (PX-200, manufactured by DAIHACHI CHEMICAL INDUSTRY CO., LTD.) was added to the polyurethane adhesive of Example 1 and no flame-retardant layer was formed on the skin layer.

Comparative Example 5

The base cloth of Example 1 was immersed in a water bath to which an appropriate amount of a phosphate ester flame retardant (Nikka Fine P-3 manufactured by Nikka Chemical Co., Ltd.) was added, squeezed with a mangle, and subjected to a flame-retardant processing of crosslinking and drying at 140° C. for 2 minutes.

A synthetic leather of Comparative Example 5 having a layer structure in which an adhesion layer and a skin layer were provided in this order on a base cloth subjected to flame-retardant processing was obtained in the same manner as in Example 1, except that the above-described flame-retardant-processed base cloth was used, and no flame-retardant layer was formed on the skin layer.

Comparative Example 6

A synthetic leather of Comparative Example 6 having a layer structure in which an adhesion layer, and a skin layer using a flame-retardant resin were provided in this order on a base cloth was obtained in the same manner as in Example 1, except that a skin layer was formed using U365 (trade name: manufactured by Nippon Synthetic Chemical Industry Co., Ltd., a flame-retardant polyurethane resin) in place of the resin for forming a skin layer used in Example 1, and no flame-retardant layer was formed on the skin layer.

Comparative Example 7

A synthetic leather of Comparative Example 7 having a layer structure in which an adhesion layer and a skin layer were provided in this order on a flame retardant base cloth was obtained in the same manner as in Example 1, except that a flame retardant base cloth woven from Kanecaron (registered trademark, manufactured by Kaneka Corporation, an acrylic flame-retardant fiber) was used in place of the base cloth of Example 1, and no flame-retardant layer was formed on the skin layer.

Comparative Example 8

A synthetic leather of Comparative Example 8 having a layer structure in which an adhesion layer and a skin layer were provided in this order on a base cloth was obtained in the same manner as in Example 1, except that the flame-retardant layer was not formed on the skin layer in Example 1.

Comparative Example 9

A synthetic leather of Comparative Example 9 having a layer structure in which an adhesion layer and a skin layer were provided in this order on a base cloth on which a wet microporous layer was formed was obtained in the same manner as in Example 2, except that the flame-retardant layer was not formed on the skin layer in Example 2.

Comparative Example 10

A synthetic leather (PVC leather) of Comparative Example 10 having a layer structure in which a resin layer including a flame retardant, and a skin layer were provided in this order on a base cloth was obtained in the same manner as in Example 4, except that 8.0 parts by mass of a gel batch containing 80% antimony trioxide as a flame retardant was added to the mixture for forming a resin layer used in Example 4 to form a resin layer, and no flame-retardant layer was formed on the skin layer.

Comparative Example 11

A synthetic leather (PVC leather) of Comparative Example 11 including, on a base cloth, a resin layer and a skin layer in this order was obtained in the same manner as in Example 4, except that the flame-retardant layer was not formed on the skin layer in Example 4.

(Evaluation of Obtained Synthetic Leather)

The obtained synthetic leather was evaluated by the following method. The results are shown in Table 1 below.

1. Flame Retardancy

Each of the obtained synthetic leathers was evaluated for flame retardancy in accordance with JIS-D1201 (1998). The flame retardancy was evaluated according to the following criteria.

The rate at which combustion spread after ignition of a synthetic leather was measured and used as an index of flammability. According to the Standards, when the rate is 100 mm/min or less, it is evaluated that the leather is flame retardant.

Incombustible indicates that fire was not ignited even when a flame was approached, and "0" indicates a state in which fire was ignited but not spread. In the present disclosure, incombustible or "0" was evaluated as being favorable.

2. Bending Resistance

The bending resistance of each synthetic leather was evaluated in accordance with JIS-L1096 (2010) method A. The results are shown in Table 1 below.

Regarding the bending resistance, a range of from 40 mm to 80 mm was evaluated as favorable for a synthetic leather including a urethane resin, and a range of from 50 mm to 120 mm was evaluated as favorable for a synthetic leather including PVC.

3. Texture

The texture of each synthetic leather was sensory evaluated by 10 monitors.

Those with a mild, soft feel close to natural leather were evaluated as "favorable", those that were slightly lower than favorable but acceptable were evaluated as "slightly favorable", and others were evaluated as "slightly unfavorable".

As the evaluation result, the most frequent evaluation result by 10 monitors was employed, and when there was the same number of evaluation results, a more favorable evaluation result was employed.

4. Material Cost Ratio

The cost of a material used for preparation of each synthetic leather per 1 $m^2$ of the synthetic leather was calculated and evaluated according to the following criteria. Rank A was evaluated as favorable.

A: 60 yen/m² or less
B: More than 60 yen/m² and 100 yen/m² or less
C: More than 100 yen/m²

5. Total Evaluation

The overall evaluation was based on the following criteria by integrating the evaluation results of 1. Flame retardancy, 2. Bending resistance, 3. Texture, and 4. Material Cost Ratio described above.

A: All evaluation results were "favorable"
B: Two or less categories outside the "favorable" range
C: Exceeding the standard burning rate in the evaluation of 1. Flame retardance, or, three or more categories outside the "favorable" range in each evaluation All publications, patent applications, and technical standards described herein are incorporated by reference herein to the same extent as if each publication, patent application, or technical standard was specifically and individually indicated to be incorporated by reference.

DESCRIPTION OF SYMBOLS 10, 20 Synthetic leather
12 Base cloth
14 Adhesion layer
16 Skin layer
18 Flame-retardant layer

TABLE 1

| | Flame-retardant layer of the present disclosure (location) | Other flame-retardant treatment | Flame retardancy | Bending resistance (mm) | Texture | Material cost ratio | Overall evaluation |
|---|---|---|---|---|---|---|---|
| Example 1 | Present (Outermost layer) | — | Incombustible | 70 | Favorable | A | A |
| Example 2 | Present (Outermost layer) | — | Incombustible | 75 | Favorable | A | A |
| Example 3 | Present (Under surface treatment layer) | — | 0 | 72 | Favorable | A | A |
| Example 4 | Present (Outermost layer) | — | Incombustible | 105 | Favorable | A | A |
| Comparative Example 1 | Present (Under skin layer) | — | 68 (mm/min) | 74 | Favorable | A | B |
| Comparative Example 2 | Absent | Base cloth flame retardant | 85 (mm/min) | 93 | Slightly unfavorable | C | C |
| Comparative Example 3 | Present (Back surface of base cloth) | — | 96 (mm/min) | 82 | Slightly favorable | B | C |
| Comparative Example 4 | Absent | Adhesion layer flame retardant (Known flame-retardant treatment) | Incombustible | 89 | Slightly unfavorable | A | B |
| Comparative Example 5 | Absent | Base cloth flame retardant | Incombustible | 85 | Slightly favorable | B | C |
| Comparative Example 6 | Absent | Skin layer flame retardant (Comparative flame-retardant layer) | 25 (mm/min) | 92 | Slightly unfavorable | C | C |
| Comparative Example 7 | Absent | Base cloth flame retardant | 52 (mm/min) | 96 | Slightly unfavorable | C | C |
| Comparative Example 8 | Absent | — | 160 (mm/min) | 65 | Favorable | — | C |
| Comparative Example 9 | Absent | — | 145 (mm/min) | 71 | Favorable | — | C |
| Comparative Example 10 | Absent | Skin layer flame retardant (Comparative flame-retardant layer) | Incombustible | 132 | Slightly unfavorable | A | B |
| Comparative Example 11 | Absent | — | 169 (mm/min) | 95 | Favorable | — | C |

From the results in Table 1, the synthetic leathers of Examples 1 to 4 in which the flame-retardant layer according to the present disclosure was provided on the outermost surface or provided under the surface treatment layer was favorable in flame retardancy and favorable in feel and flexibility, respectively. Further, the material cost was each also favorable, and the overall evaluation was each "A".

On the other hand, in Comparative Examples 1 and 3, in which the flame-retardant layer according to the present disclosure was provided not on the outermost surface but on a lower portion of the skin layer or on the back surface of the base cloth, favorable flame retardancy was not attained, respectively. Further, each of Comparative Examples that include no flame-retardant layer according to the present disclosure was inferior in at least one of flame retardancy or feel.

The disclosure of Japanese Patent Application No. 2017-208527 filed on Oct. 27, 2017 is incorporated herein by reference in its entirety.

22 Resin layer

What is claimed is:

1. A synthetic leather comprising:
a base cloth; and
on the base cloth, an adhesion layer, a skin layer, and a flame-retardant layer, in this order, wherein the flame-retardant layer comprises at least one selected from hydrotalcite or a hydrotalcite-like compound, is a cured product of a composition that comprises a binder and particles having an average particle diameter of from 10 nm to 2500 nm, and is a layer having a thickness of from 1 μm to 5 μm,
wherein the hydrotalcite-like compound is a compound represented by General Formula (I) below, $$[(A^1)^{2+}_{1-x}(A^2)^{3+}_x(OH)_2][(B^1)^{n-}_{x/n} \cdot mH_2O] \quad \text{General Formula (I)}$$

wherein, in General Formula (I), $(A^1)^{2+}$ represents $Ca^{2+}$, $Mg^{2+}$, $Fe^{2+}$, $Co^{2+}$, $Ni^{2+}$, $Cu^{2+}$, or $Zn^{2+}$, and $(A^2)^{3+}$ represents $Al^{3+}$, $Ti^{from\ 3+\ to\ 4+}$, $Cr^{3+}$, $Fe^{3+}$, $Co^{3+}$, or $(Mo^{from\ 5+\ to\ 6+})$, $(B^1)^{n-}$ represents a sulfate derivative ion, a sulfonic acid derivative ion, or a phosphate derivative ion, and x represents a number of from 0.20 to 0.33, n represents a valence of an anion, and m represents an arbitrary number.

2. The synthetic leather according to claim 1, wherein at least one of the adhesion layer or the skin layer comprises a flame retardant.

3. The synthetic leather according to claim 1, further comprising an intermediate layer between the adhesion layer and the skin layer.

4. The synthetic leather according to claim 3, wherein the intermediate layer comprises a flame retardant.

5. A synthetic leather comprising:
a base cloth; and
on the base cloth, a resin layer and a flame-retardant layer, in this order, wherein the flame-retardant layer comprises at least one selected from hydrotalcite or a hydrotalcite-like compound, is a cured product of a composition that comprises a binder and particles having an average particle diameter of from 10 nm to 2500 nm, and is a layer having a thickness of from 1 μm to 5 μm,
wherein the hydrotalcite-like compound is a compound represented by General Formula (I) below, $$[(A^1)^{2+}{}_{1-x}(A^2)^{3+}{}_x(OH)_2][(B^1)^{n-}{}_{x/n}\cdot mH_2O] \quad \text{General Formula (I)}$$

wherein, in General Formula (I), $(A^1)^{2+}$ represents $Ca^{2+}$, $Mg^{2+}$, $Fe^{2+}$, $Co^{2+}$, $Ni^{2+}$, $Cu^{2+}$, or $Zn^{2+}$, and $(A^2)^{3+}$ represents $Al^{3+}$, $Ti^{from\ 3+\ to\ 4+}$, $Cr^{3+}$, $Fe^{3+}$, $Co^{3+}$, or $(Mo^{from\ 5+\ to\ 6+})$, $(B^1)^{n-}$ represents a sulfate derivative ion, a sulfonic acid derivative ion, or a phosphate derivative ion, and x represents a number of from 0.20 to 0.33, n represents a valence of an anion, and m represents an arbitrary number.

6. The synthetic leather according to claim 5, wherein the resin layer comprises a vinyl chloride resin.

7. The synthetic leather according to claim 1, wherein the base cloth comprises at least one flame-retardant fiber selected from the group consisting of an aramid fiber, a meta-aramid fiber, a polyphenylene sulfide fiber, an acrylic fiber, a vinyl chloride fiber, a polychlal fiber, a vinylidene chloride fiber, an acrylic-vinyl chloride copolymer fiber, an acrylic-vinylidene chloride copolymer fiber, and a polybenzimidazole fiber.

8. The synthetic leather according to claim 1, wherein the base cloth is a base cloth in which a non-flame retardant base cloth has been subjected to a flame-retardant treatment.

9. The synthetic leather according to claim 1, wherein the flame-retardant layer comprises hydrotalcite.

10. The synthetic leather according to claim 1, wherein the flame-retardant layer comprises the hydrotalcite-like compound.

11. The synthetic leather according to claim 5, wherein the flame-retardant layer comprises hydrotalcite.

12. The synthetic leather according to claim 5, wherein the flame-retardant layer comprises the hydrotalcite-like compound.

* * * * *